UNITED STATES PATENT OFFICE.

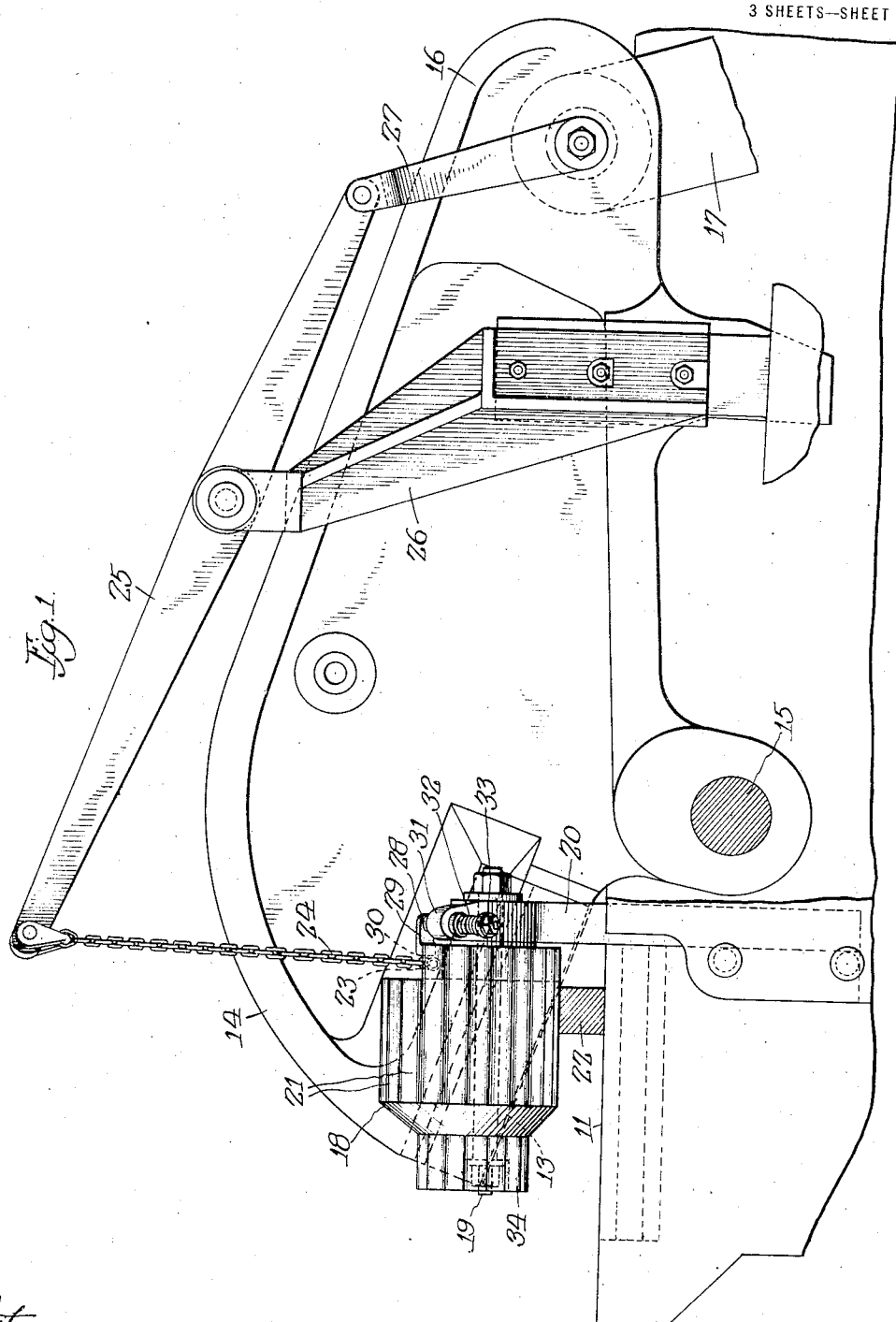

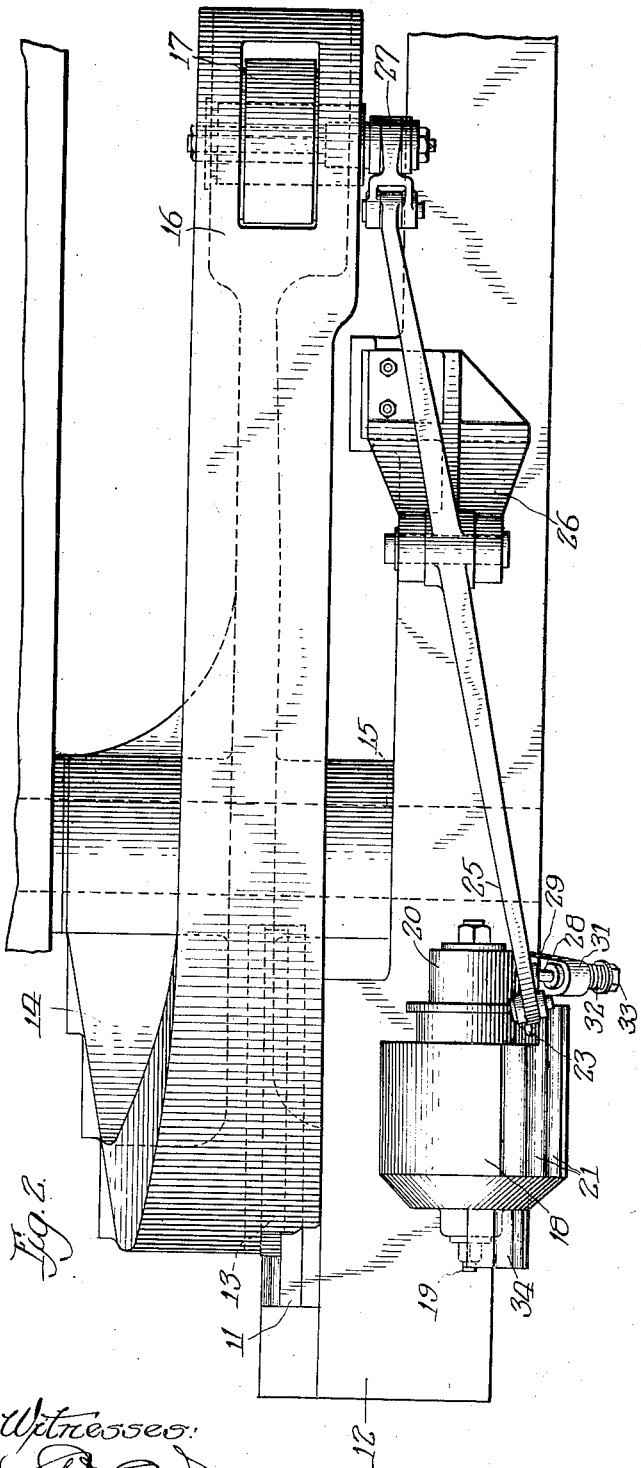

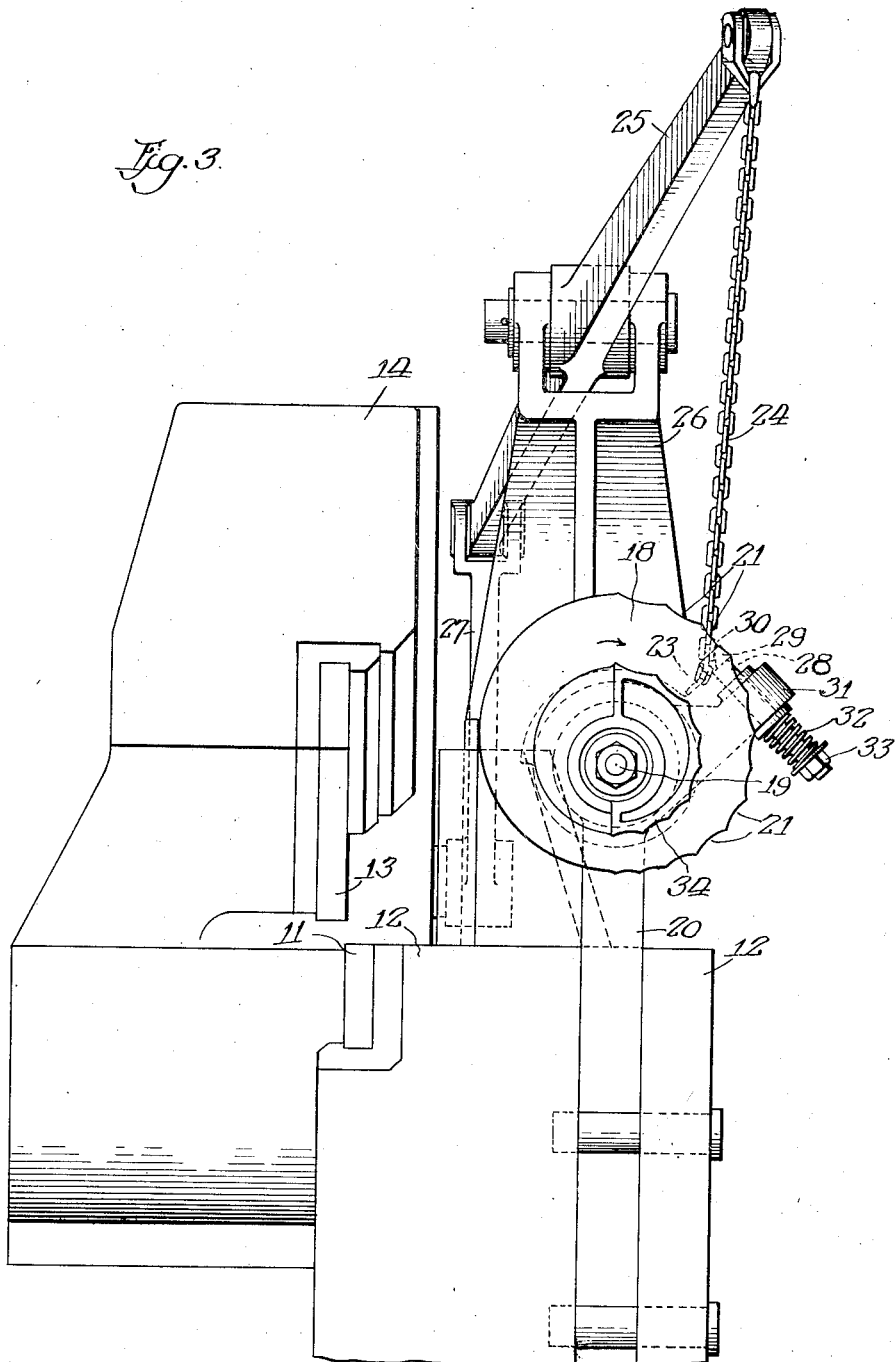

RICHARD W. SMILEY, OF DULUTH, MINNESOTA.

HOLDING MEANS FOR CUTTING MECHANISM.

1,274,617.  Specification of Letters Patent.  Patented Aug. 6, 1918.

Application filed August 20, 1917. Serial No. 187,096.

*To all whom it may concern:*

Be it known that I, RICHARD W. SMILEY, a citizen of the Dominion of Canada, and resident of Duluth, in the county of St. Louis and State of Minnesota, have invented certain new and useful Improvements in Holding Means for Cutting Mechanism, of which the following is a specification.

This invention relates to work holding means and more particularly to means for holding down a piece of material being operated upon by a shear.

One of the objects of the invention is to hold in a positive manner a piece of material which is being operated upon by a shear or the like.

Another object is to hold in a shear or the like, material of a uniform or varying thickness and to prevent the feeding of pieces of a size beyond the capacity of the shear.

And a further object is to provide a holding device for a shear or the like adapted to meet the various requirements for successful commercial operation.

These and other objects are acomplished by providing in combination coöperating shearing members and means associated therewith for positively holding in a given position a piece of material as it is being acted upon by said shearing members.

The invention is illustrated on the accompanying sheets of drawings in which—

Figure 1 is a side elevation of a shear embodying my invention;

Fig. 2 is a top plan view of the same; and

Fig. 3 is a front elevation of the same on a larger scale.

The various novel features of my invention will be apparent from the following description and drawings and will be particularly pointed out in the appended claims.

Although my invention is not necessarily limited to use in connection with a shear, I have chosen to illustrate my invention in connection with such a device.

Referring to the figures of the drawing, it will be noted that the shear 10 includes a stationary shearing blade 11 supported in its base or frame 12, and a movable shearing blade 13, mounted in the movable shear member 14 pivoted at 15 to the base 12, one end 16 of the movable shear member receiving movement from any suitable source of power through a connecting member 17. It is apparent from this arrangement that when the rear end 16 of the shear is raised the movable shear blade 13 is lowered to coöperate with the stationary shear blade for cutting or shearing a piece of material which previously has been inserted between the blades.

It is well appreciated that when the movable shear blade passes into engagement with a piece of material to be cut, there is a great tendency for the free end of the material to swing upwardly with considerable rapidity and force. This not only is dangerous to the operator of the machine but may cause relatively thin pieces which are being sheared to become wedged between the shear blades, especially if they are dull, causing damage to the shear lever or the stationary knife holder. To overcome these objectionable features I have provided means for holding in a positive manner a piece of material which is being operated on by the shear. In this instance the holding means takes the form of a cam roller 18 which is rotatably mounted upon a pin 19 which in turn is supported by a bracket or standard 20 which is rigidly secured to the shear frame. This cam roller 18 is provided with a plurality of corrugations 21 upon its surface. These corrugations may be formed in the cam roller or the cam roller may be provided with corresponding steel strips which may be secured in any suitable manner to the periphery of the roller. It will be noted that the corrugated surfaces 21 of the roller are arranged eccentrically with respect to the center of the pin 19 so that certain ones of the corrugations may approach the upper surface of the stationary knife holder 12 more closely than others. In this way this cam roller 18 which is the work holding means, is capable of holding down pieces of material which are to be sheared and which vary in size. As shown in Fig. 1 of the drawings a square piece of metal 22 is inserted between the stationary and movable shearing blades 11 and 13, said piece of material 22 being the maximum size of solid material which the shears will safely take. In other words, if a piece of material larger than the piece 22 be inserted between the shears, it would be beyond the capacity of the shear and it may cause damage thereto. So it is seen that the cam roller 18 not only acts as holding means but also limits the size of material which may be fed between the shear blades. If the piece of material to be held is smaller than the piece 22 shown in the machine, the cam roller 18 will rotate in a clockwise direction as viewed in Fig. 3 about its supporting pin 19 and pass into engagement with the piece of material to be sheared and will rest thereon with sufficient pressure to hold the piece of material down in its normal position in engagement with the upper surface of the base or frame 12. It is apparent that if the cam roller 18 should rotate substantially half a revolution from the position shown in Fig. 3, its largest corrugation or holding section would be adjacent the upper surface of the frame 12 to hold a very thin piece of material in engagement therewith. In other words, the cam roller 18 is capable of holding to the upper surface of the stationary knife frame 12, pieces of material which may vary considerably in thickness.

Connected to the cam roller at any suitable point 23 is a chain 24 the upper end of which is operatively connected to the front end of a lever 25 which is pivoted intermediate its ends to a bracket 26 supported by the shear frame. The rear end of the lever 25 is pivotally connected to a link 27 which is pivotally connected to the rear end of the movable shear member 14. By means of this arrangement it is apparent that the cam roller 18 is raised indirectly by the movable shear member 16 through the intermediate connections mentioned. When I speak of the cam roller being raised I mean that the same is rotated in a counter-clockwise direction as viewed in Fig. 3, to increase the distance between the nearest point on the surface of the cam roller and the work supporting frame 12. The cam roller 18, when it is free to move under its own weight, rotates in a clockwise direction as viewed in Fig. 3, for the reason that its center of gravity when in its highest position is to the right of a vertical center line through the center of the supporting pin 19. In other words, there is always a tendency for the cam roller to turn in the direction of the arrow. The shear lever or movable shear member 14, is so connected to the cam roller 18 through the lever 25 and link 27, that the cam roller rises and falls synchronously with the shear lever 14, and it is to be noted that the arrangement of the parts are such that the cam roller travels downwardly in advance of the movable shear blade 13. In other words, the cam roller 18 meets and is firmly holding the piece of material to be cut before the movable shear blade 13 passes into engagement with said piece of material.

The counter-clockwise rotative movement of the cam roller 18 is yieldingly limited by a stop member 28, one end of which is provided with a laterally extending projection. 29 engaging a coöperative portion 30 of the cam roller, said stop member 28 being slidably mounted in a bearing portion 31 of the bracket 20 and having a spring 32 surrounding its lower end and being interposed between a nut 33 on the end of the stop member 28 and the bearing portion 31.

By means of this arrangement it is possible to hold rigidly any piece of material of a uniform or of a varying thickness, the cam roller automatically adapting itself to any shape or thickness within the limits of the shear, the cam roller also acting in a manner to prevent feeding pieces of a size beyond the capacity of the shear. This cam roller also acts as a safeguard to the workman feeding material to the shear and also acts as a safeguard to the machine itself in preventing relatively thin pieces from becoming wedged between the knife blades when the same have become worn. The arrangement is such, also, that the line of any upward force caused by the movable knife blade descending upon a piece of material to be cut, passes through the center of the supporting pin 19, or substantially so, so that when force is applied, there is no tendency for the cam roller to back up, or turn in a counter-clockwise direction as viewed in Fig. 3.

It will be noted, also, that the outer end 34 of the cam roller 18 is considerably reduced in size and has holding corrugations corresponding to the ones in the main part of the cam roller, so that large pipes of various sections may be firmly held in place and safely sheared.

It is evident that there may be various modifications of the invention herein particularly shown and described, and it is my intention to cover all such modifications which do not involve a departure from the spirit and scope of the invention as set forth in the following claims.

I claim:

1. In combination, coöperating shearing members, and a cam associated therewith and controllable thereby for positively holding in a given position a piece of material as it is being acted upon by said shearing members.

2. In combination, coöperating relatively movable cutting members, and a cam associated therewith and controllable thereby for positively holding in a given position a piece of material as it is being acted upon by said cutting members.

3. In combination, coöperating shearing members, and a cam associated therewith and controllable thereby for holding a piece of material as it is being acted upon by said shearing members.

4. In combination, coöperating shearing members, and revolubly mounted means associated therewith and controllable thereby for holding a piece of material as it is being acted upon by said shearing members.

5. In combination, coöperating shearing members, and a cam controllable thereby and for holding pieces varying in size as the same are acted upon by said shearing members.

6. In combination, coöperating shearing members, and a cam controllable thereby and movable into engagement with a piece to be acted upon by said shearing members prior to shearing action.

7. In combination, coöperating shearing members, and eccentrically mounted means automatically movable into engagement with a piece to be acted upon by said shearing members prior to shearing action.

8. In combination, coöperating shearing members, and means including a cam controllable thereby and associated therewith having a plurality of holding portions for positively holding material of different sizes as said material is acted upon by said shearing members.

9. In combination, coöperating shearing members, and eccentrically mounted means including a cam controllable thereby and for holding a piece of material as it is being acted upon by said shearing members.

10. In combination, coöperating shearing members, a supporting member, and a cam rotatably mounted on said supporting member and associated with said shearing members to hold a piece of material as it is being acted upon by said shearing members.

11. In combination, coöperating shearing members, a supporting member, a cam rotatably mounted on said supporting member and associated with said shearing members to hold a piece of material as it is being acted upon by said shearing members, and means for actuating said cam.

12. In combination, coöperating shearing members, a supporting member, a member rotatably mounted on said supporting member and associated with said shearing members to hold a piece of material as it is being acted upon by said shearing members, and means associated with the shearing members for actuating said holding member in one direction, said holding member being capable of rotating itself in another direction due to its own weight.

13. In combination, coöperating shearing members, a supporting member carrying said shears, a member rotatably mounted on said supporting member and associated with said shearing members to hold a piece of material as it is being acted upon by said shearing members, and means for limiting movement of said holding member.

14. In combination, a shear having stationary and movable shearing members, and a work holding member including a cam for holding materials of varying sizes associated therewith and movable in time order with said movable shearing member.

15. In combination, a shear having stationary and movable shearing members, and a work holding member including a cam for holding materials of varying sizes adapted to engage a piece of material to be acted upon by said shearing members, said holding member and movable shearing member being movable simultaneously, said holding member engaging the work prior to shearing action of said shearing members.

16. In combination, a shear having stationary and movable shearing members, and a revolubly mounted member controlled by said moving member and having a plurality of eccentrically arranged holding portions for holding a piece of material to be acted upon by said shearing members.

17. In combination, a shear having stationary and movable shearing members, a revolubly mounted member having a plurality of eccentrically arranged holding portions for holding a piece of material to be acted upon by said shearing members, and means for limiting rotation of said member in one direction.

18. In combination, a shear having stationary and movable shear members, a member including a cam for holding a piece of material as it is being acted upon by said shearing members, and a supported lever one end of which is operatively connected to the movable shear member and the other end of which is connected to said holding member for transmitting movement to the latter.

19. In combination, a shear having stationary and movable shearing members, a holding member for holding a piece of material as it is being acted upon by said shearing members, and a supported lever one end of which is operatively connected to the movable shear member and the other end of which is operatively connected to said holding member for moving said holding member in one direction, said holding member being capable of moving itself in another direction due to its own weight.

20. In combination, a shear having stationary and movable shearing members, a support, a cam roller rotatably mounted on said support for holding a piece of material as it is acted upon by said shear, and a supported lever one end of which is operatively connected to said movable shearing member and the other end of which is operatively connected to the cam roller whereby the cam roller may be positively rotated in one direction to withdraw it from the piece of material being held.

21. In combination, a shear having stationary and movable shearing members, a support, a cam roller rotatably mounted on said support for holding a piece of material as it is acted upon by said shear, and a supported lever one end of which is operatively connected to said movable shearing member and the other end of which is operatively connected to the cam roller whereby the cam roller may be positively rotated in one direction to withdraw it from the piece of material being held, said cam roller being movable in another direction under the influence of its own weight to engage the piece of material to be held.

22. In combination, coöperating shearing members, and means operatively associated therewith having a plurality of sets of holding surfaces for holding material varying in size as said material is acted upon by said shearing members.

23. In combination, a shear having stationary and movable shearing members, a support, and an eccentric cam roller having a plurality of sets of holding surfaces and adapted to be rotated in one direction by a flexible connection to the movable shearing member, and adapted to rotate in the opposite direction by means of its own weight.

24. In combination, a shear having stationary and movable shearing members and a revolubly mounted member having a plurality of eccentrically arranged holding portions for holding a piece of material to be acted upon by said shearing members.

Signed at city of Duluth, State of Minn., this 15th day of August, A. D. 1917.

RICHARD W. SMILEY.